(12) United States Patent
Ikäheimo et al.

(10) Patent No.: US 9,479,406 B2
(45) Date of Patent: Oct. 25, 2016

(54) DISPLAYING SIGNAL FLOWS IN NETWORK ANALYSIS TOOL

(71) Applicant: EXFO Oy, Oulu (FI)

(72) Inventors: Jorma Ikäheimo, Oulu (FI); Timo Ainali, Oulu (FI); Sakari Yrttiaho, Kempele (FI); Kamal Bhambhani, Pune (IN)

(73) Assignee: EXFO OY, Oulu (FI)

( * ) Notice: Subject to any disclaimer, the term of this patent is extended or adjusted under 35 U.S.C. 154(b) by 59 days.

(21) Appl. No.: 14/296,717

(22) Filed: Jun. 5, 2014

(65) Prior Publication Data

US 2015/0055484 A1    Feb. 26, 2015

(30) Foreign Application Priority Data

Aug. 22, 2013 (EP) .................................. 13181326

(51) Int. Cl.
*H04L 12/26* (2006.01)

(52) U.S. Cl.
CPC ......... *H04L 43/045* (2013.01); *H04L 12/2602* (2013.01); *H04L 43/062* (2013.01); *H04L 43/18* (2013.01); *H04L 43/028* (2013.01); *H04L 43/0847* (2013.01)

(58) Field of Classification Search
CPC ... H04L 43/00; H04L 43/045; H04L 43/028; H04L 43/18; H04L 43/062; H04L 43/12; H04L 12/2602; H04L 43/026
USPC ............... 370/241, 242, 248, 252, 253, 250; 715/734
See application file for complete search history.

(56) References Cited

U.S. PATENT DOCUMENTS

| | | | | |
|---|---|---|---|---|
| 6,697,337 B1 * | 2/2004 | Cafarelli | ............. | H04L 12/2602 370/224 |
| 2004/0066753 A1 * | 4/2004 | Grovenburg | ........ | H04L 12/2602 370/252 |
| 2004/0196308 A1 * | 10/2004 | Blomquist | ............. | H04L 43/18 715/734 |
| 2011/0145763 A1 | 6/2011 | Dong et al. | | |
| 2011/0314146 A1 * | 12/2011 | Sugita | ..................... | H04L 12/56 709/224 |
| 2012/0051234 A1 * | 3/2012 | Gintis | ................... | H04L 43/026 370/250 |

OTHER PUBLICATIONS

European Search Report dated Oct. 4, 2013 for Application No. EP 13 18 1326.
Ghislain Ndeuchi, "Wireshark Sniffing", Jan. 28, 2010, pp. 1-17.
Office Action dated Jan. 5, 2016 for Application No. EP 13 181 326.3.
Ghislain Ndeuchi: "Wireshark Sniffing", Jan. 28, 2010, Retrieved from the Internet: URL:http://web.archive.org/web/20100710134914/http://www.unappel.ch/public/100119-wireshark-xlite/ [retrieved on Sep. 30, 2013].
"VOIP Fundamentals- SSD TECH", Dec. 4, 2015, Retrieved from the Internet: URL: http://ssd-tech.com/knowledge-base/networking/voipfundamentals/[retrieved on Dec. 4, 2015].

* cited by examiner

*Primary Examiner* — Anh Ngoc Nguyen
*Assistant Examiner* — Harun Chowdhury
(74) *Attorney, Agent, or Firm* — Ladas & Parry LLP

(57) ABSTRACT

This document discloses a solution for outputting a message sequence chart in a computer apparatus. Messages transferred in a communication network are acquired, wherein the messages are logically divided into control plane messages and data plane messages and each message is associated with its transmission direction. Display of the control plane messages is caused on a display screen in the message sequence chart and in a form where each control plane message is displayed together with a unidirectional indicator indicating the transmission direction of the control plane message. Display of the data plane messages is caused in the message sequence chart in a compressed form with a single multidirectional indicator representing a plurality of data plane messages and indicating the transmission directions of the plurality of data plane messages.

15 Claims, 4 Drawing Sheets

DISPLAYING SIGNAL FLOWS IN NETWORK ANALYSIS TOOL

FIELD

The invention relates to the field of network analyser devices and, particularly, arranging display content in such a network analyser device.

BACKGROUND

A network analyser may be connected to a communication network and monitor transfer of messages in the communication network. The network analyser may connect to an interface or a network node and capture messages transferred through the interface or to/from the network node. The captured messages may be stored in a database from which they may be retrieved for display in a network analysis tool.

BRIEF DESCRIPTION

According to an aspect of the invention, there is provided a method for outputting a message sequence chart in a computer apparatus, the method comprising: acquiring messages transferred in a communication network, wherein the messages are logically divided into control plane messages and data plane messages and each message is associated with its transmission direction; causing display of the control plane messages on a display screen in the message sequence chart and in a form where each control plane message is displayed together with a unidirectional indicator indicating the transmission direction of the control plane message while the data plane messages in the message sequence chart in a compressed form with a single multidirectional indicator representing a plurality of data plane messages and indicating the transmission directions of the plurality of data plane messages.

According to another aspect of the invention, there is provided an apparatus, comprising at least one processor and at least one memory including a computer program code. The at least one memory and the computer program code are configured, with the at least one processor, to cause the apparatus to: acquire messages transferred in a communication network, wherein the messages are logically divided into control plane messages and data plane messages and each message is associated with its transmission direction; cause display of the control plane messages on a display screen in a message sequence chart and in a form where each control plane message is displayed together with a unidirectional indicator indicating the transmission direction of the control plane message while causing display of the data plane messages in the message sequence chart in a compressed form with a single multidirectional indicator representing a plurality of data plane messages and indicating the transmission directions of the plurality of data plane messages.

According to another aspect, there is provided a computer program product embodied on a non-transitory distribution medium readable by a computer and comprising program instructions which, when loaded into an apparatus, execute a computer process for outputting a message sequence chart in the apparatus, the process comprising: acquiring messages transferred in a communication network, wherein the messages are logically divided into control plane messages and data plane messages and each message is associated with its transmission direction; causing display of the control plane messages on a display screen in the message sequence chart and in a form where each control plane message is displayed together with a unidirectional indicator indicating the transmission direction of the control plane message while the data plane messages in the message sequence chart in a compressed form with a single multidirectional indicator representing a plurality of data plane messages and indicating the transmission directions of the plurality of data plane messages.

Embodiments of the invention are defined in the dependent claims.

LIST OF DRAWINGS

Embodiments of the present invention are described below, by way of example only, with reference to the accompanying drawings, in which FIG. 1 illustrates a network analysis scenario to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
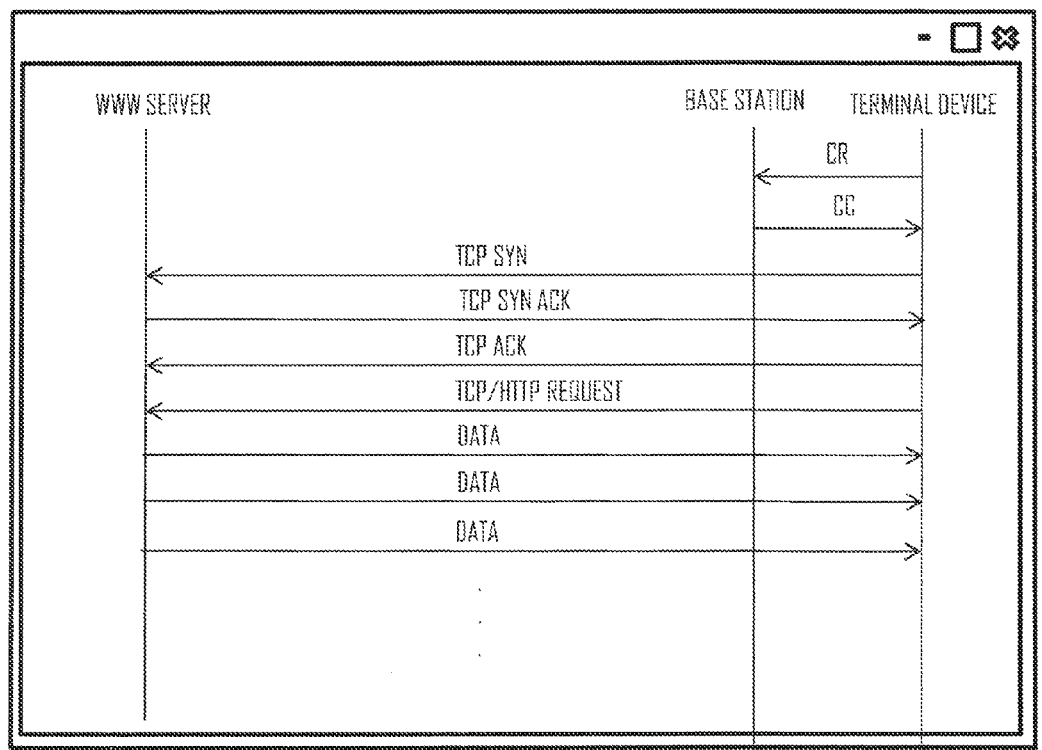
Figure 1:

FIG. 1 illustrates a display of a network analysis tool. Referring to FIG. 1, a network analysis system 130 may be connected to a communication network 140 and configured to monitor network traffic in the communication network 140. The communication network may comprise one or more computer networks, e.g. a radio access network of a cellular communication system, a core network of the cellular communication system, Internet Protocol (IP) based communication network(s), etc. The cellular communication system may comprise a Universal Mobile Telecommunication System Long-term Evolution (UMTS LTE) or a similar cellular communication system.

The network analysis system 130 may be configured to capture packets or messages transferred in the communication network and operate as a diagnostics tool used to monitor the operation and possible errors or malfunctions in the communication network 140. The network analysis system 130 may capture the messages from an interface of the communication network or directly from a network element of the communication network. An example of the interface is S1 interface of the UMTS LTE, and an example of the network element is an evolved Node B of the UMTS LTE. The network analysis system may thus be connected to the interface to acquire the messages externally from the network element or connected to the network element to acquire the messages from an internal circuitry of the network element. The network analysis system 130 may comprise a display unit through which a user of the network analysis system 130 may monitor the operation of the communication network. The network analysis system may output message sequence charts of one or more sessions to the display unit, as shown in FIG. 1. FIG. 1 illustrates a message sequence chart of a terminal device of the communication network. The terminal device may be a mobile station of a cellular communication system, for example. The terminal device associated with the message sequence chart may be identified in the display by its international mobile subscriber identity (IMSI), for example. A message sequence chart illustrates message flows in a determined part or parts of the communication network 140, e.g. between one or more network nodes of the communication network or over one or more network interfaces. The message sequence chart may show messages on one or more protocol layers. In FIG. 1, the display illustrates control plane messages exchanged between a terminal device and a base station of a cellular communication system, e.g. connection establishment messages. The display further illustrates messages exchanged between the terminal device and a network server on a higher protocol layer. These messages may be understood as data plane messages in the sense that they carry data traffic between the server and the terminal device at least from the point of view of the cellular communication system. The data plane messages in this example comprise transport control protocol (TCP) synchronization messages, a request to transfer payload data, and the actual payload data transferred from the server to the terminal device. The terminal device and the base station and/or another network element of the cellular communication system may exchange further control plane messages related to handovers, radio resource management, etc. but the majority of the exchanged messages may be data plane messages. The control plane message may have a higher importance than the data plane messages from the viewpoint of analysing the operation of the network, and huge majority of the data plane messages in the message sequence chart may complicate the readability of the chart.

Figure 2:
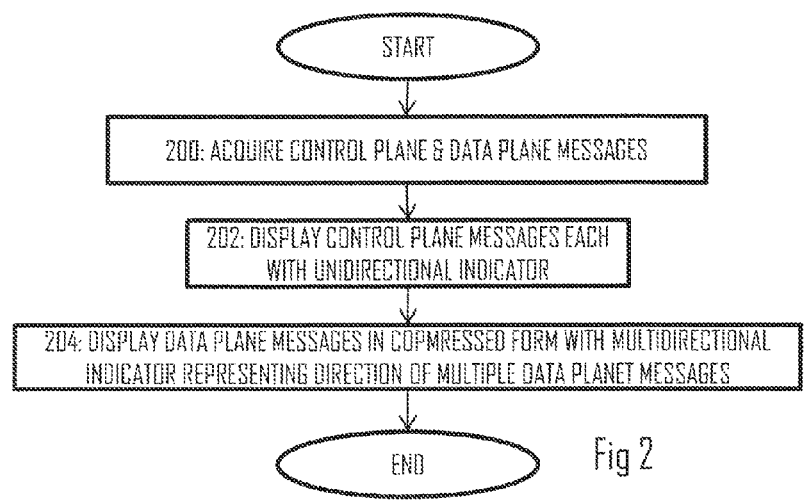
FIG. 2 is a flow diagram of a process for displaying a message sequence chart according to an embodiment of the invention.

FIG. 2 illustrates a flow diagram of an embodiment of a computer-implemented method for providing a compressed display view of the message sequence chart. The method may be carried out as a computer process defined by a computer program product in a computer apparatus. Referring to FIG. 2, the method comprises acquiring messages transferred in a communication network, wherein the messages are logically divided into control plane messages and data plane messages and each message is associated with its transmission direction (block 200). In block 202, the computer apparatus causes display of the control plane messages on a display screen in a message sequence chart and in a form where each control plane message is displayed together with a unidirectional indicator indicating the transmission direction of the control plane message. In block 204, the computer apparatus causes display of the data plane messages in the message sequence chart in a compressed form with a single multidirectional indicator representing a plurality of data plane messages and indicating the transmission directions of the plurality of data plane messages.

Figure 3:
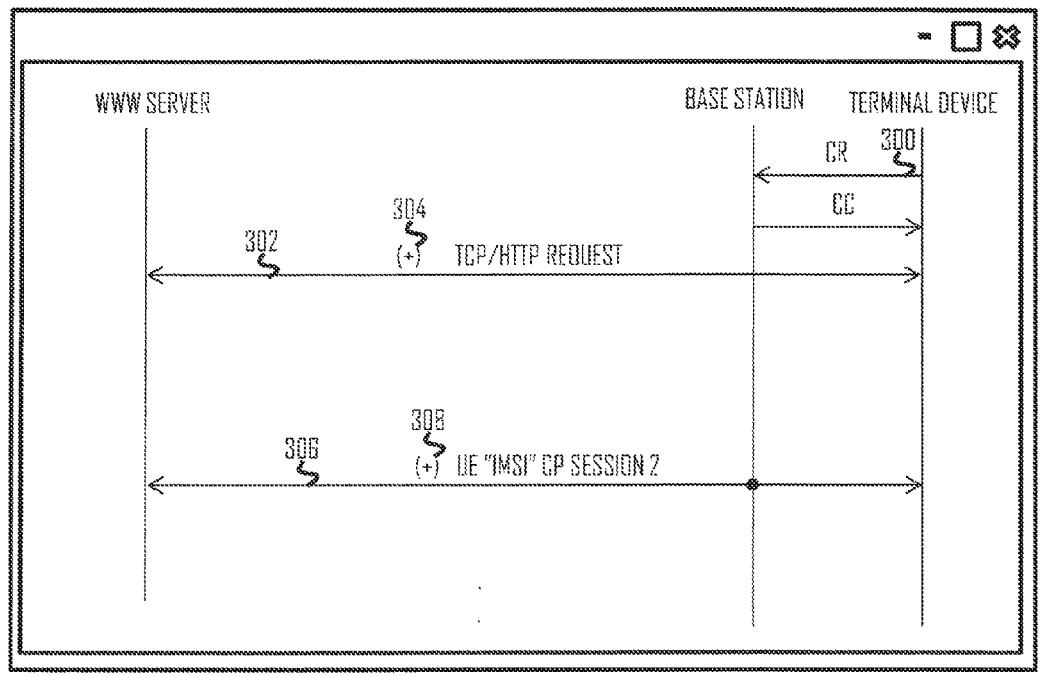
FIG. 3 illustrates a compressed view of a message sequence chart according to an embodiment of the invention.

FIG. 3 illustrates the message sequence chart of FIG. 1 in a compressed form where the plurality of data plane messages are compressed under a single message exchange event represented by a character string representing the message exchange event and a single multidirectional indicator 302, e.g. a two-directional arrow, indicating directions to which the messages comprised in the message exchange event are transferred and at least end nodes involved in the exchange of the messages. The control plane messages may still be illustrated as individual messages together with a unidirectional indicator 300, e.g. a unidirectional arrow. It should be appreciated that the arrowhead may be replaced by any other form that represents the direction of the indicator, e.g. a circle, a square, a disk, or a dot.

In an embodiment, the control plane messages may be compressed in the similar manner, e.g. the control plane messages are displayed in the message sequence chart in a compressed form with a single multidirectional indicator representing a plurality of control plane messages and indicating the transmission directions of the plurality of control plane messages.

With respect to the compression logic, the plurality of messages of the message sequence chart may be compressed under the single multi-directional indicator on the basis of a feature that is common to the plurality of messages. Such a common feature may comprise at least one of the following: the messages belong to the same application transferring the data, the messages are transferred according to the same communication protocol, the messages are all associated with the same originating device and/or a destination device, and the messages belong to the same message flow or session. Any other common feature may be used as a basis for the compression logic. The compression logic may be selected by a user through settings of the computer program which enables the user to compress those messages that are of less importance to the user.

A text describing the compressed contents and illustrated in connection with the multidirectional indicator may comprise the above-described common feature, e.g. the compressed messages belong to the same request such as the transport control protocol/hypertext transfer protocol (TCP/HTTP) request illustrated in FIG. 3. In another embodiment, the text comprises at least one of the following: an IMSI or a mobile station international subscriber directory number (MSISDN) of the terminal device or devices involved, a start time and/or an end time of a session analysed, the number of messages compressed and/or comprised in the session, a status of the session, and an error indicator indicating that at least one error has been detected in the session.

The multi-directional indicator 302 illustrated in FIG. 3 illustrates the transmission directions between two end points, the terminal device and an internet server in this example. In an embodiment where the compressed form of a message sequence comprises messages transferred amongst a number of displayed network nodes higher than two, the multi-directional indicator may indicate the network nodes involved in the transfer of messages. Referring to FIG. 3, if the compressed form comprises messages transferred between the terminal device and the internet server and messages transferred between the terminal device and the base station, the multi-directional indicator may point to all of them (see indicator 306). The end points may be illustrated in a similar manner as described above and an additional indicator may be provided that indicates that the message exchange involves also an intermediate node between the end points, e.g. the dot indicating the base station in the indicator 306. The text describing the messages compressed under the same multidirectional indicator 306 may again comprise any one of the above-described elements. For example, if the control plane messages of a certain session are compressed under the indicator 306, the text may comprise an identifier of the terminal device (UE) owning the session, e.g. an IMSI or MSISDN, its session identifier (illustrated in FIG. 3 by numeral "2") and an indicator of the control plane (CP) messages.

Figure 4:
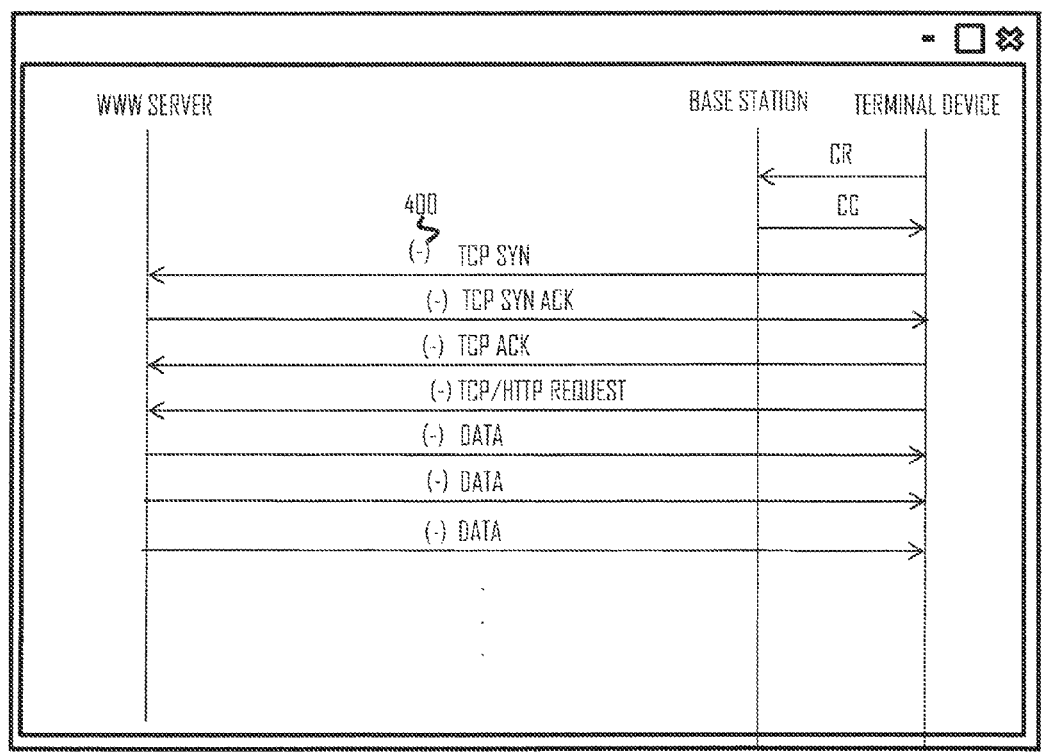
FIG. 4 illustrates an expanded view of a message sequence chart according to an embodiment of the invention.

The compressed form may further comprise an expansion component 304 which may be user-selectable. The expansion component 304 may be selected to expand the compressed form into an expanded display which is illustrated in FIG. 4. Upon detecting a user input selecting the expansion component 304 through a user interface of the computer apparatus, the computer apparatus is configured to switch the compressed form of FIG. 3 into the expanded display of FIG. 4. In the expanded display of the data plane messages, each data plane message is displayed together with unidirectional indicator indicating the transmission direction of the data plane message. Similarly, user selection of the expansion component 308, the computer apparatus switches the compressed form into the expanded display comprising the messages exchanged between the internet server and the terminal device and the messages exchanged between the base station and the terminal device, each message displayed together with a single unidirectional indicator indicating the nodes between which the message is transferred and to which direction.

Referring to the expanded display of FIG. 4, the expanded display may comprise at least one user-selectable collapse component 400 that may be used to switch back to the compressed form. Upon detecting a user input selecting the collapse component 400, the computer apparatus may switch the expanded display of FIG. 4 into the compressed display of FIG. 3. The collapse component 400 may be displayed next to one or more of the new messages displayed when switching to the expanded display. In the embodiment of FIG. 4, all messages added when switching to the expanded display are illustrated next to the collapse component and each collapse component may have the same function.

In an embodiment, the multiple display view provides a higher number of hierarchy levels in the display. For example, the grouping of messages may be provided on multiple levels where each level is more detailed or generic than the next level. Accordingly, selecting the expansion component may cause the computer apparatus to provide the next, more detailed level comprising more messages than the previous level, and this next level may comprise another expansion component that enables the user to select yet more detailed level comprising even more messages displayed on the display screen. The number of hierarchy levels may be selected according to the system design.

Figure 5:
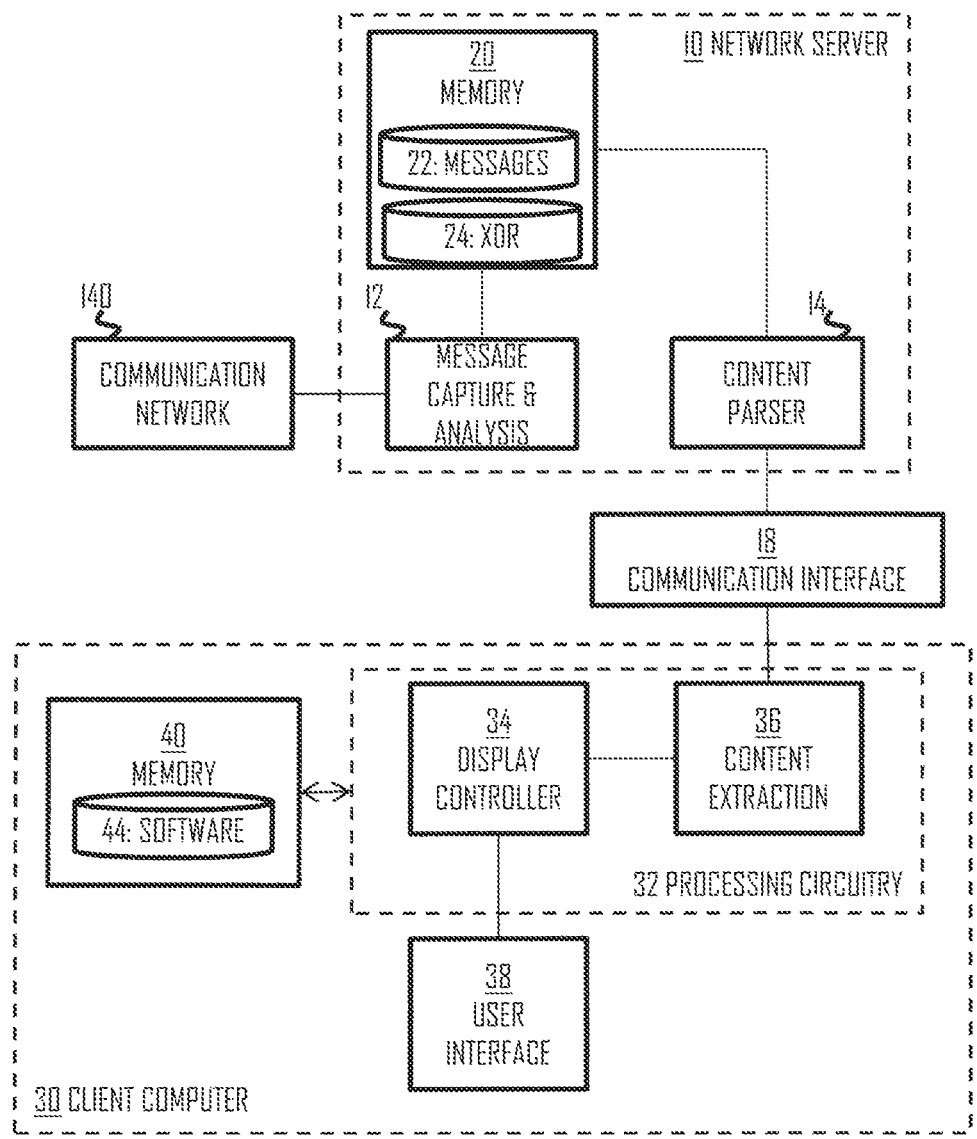
FIG. 5 illustrates a structure of a network server and a client computer comprised in the network analysis system according to an embodiment of the invention.

Now, let us describe the structure of the network analysis system 130 and a process for capturing the messages from the network and providing the display according to an embodiment of invention. Referring to FIG. 5, the network analysis system may comprise a network server 10 configured to connect to the communication network 140 and to capture the messages from the communication network 140. The network server 10 may comprise a message capture and analysis circuitry 12 or module configured to store the captured messages in a message database 22 and/or higher level call or session information associated with the captured messages in a data record 24 (XDR). The data record 24 may comprise a call data record storing information on characteristics of a voice or data call, a session data record information on characteristics of a session, or a transaction data record storing information on characteristics of a transaction. It may be understood that the message database 22 stores the captured messages in a processed form comprising grouping of captured messages at least on some level, and the data record stores a presentation of the a status and/or one or more events of individual calls or sessions transferring the captured messages. The message database 22 and the data record 24 may be stored in at least one memory 20 of the network server, e.g. on a hard drive. The at least one memory 20 may further store computer program instructions configuring the operation of the network server 10.

Figure 6:
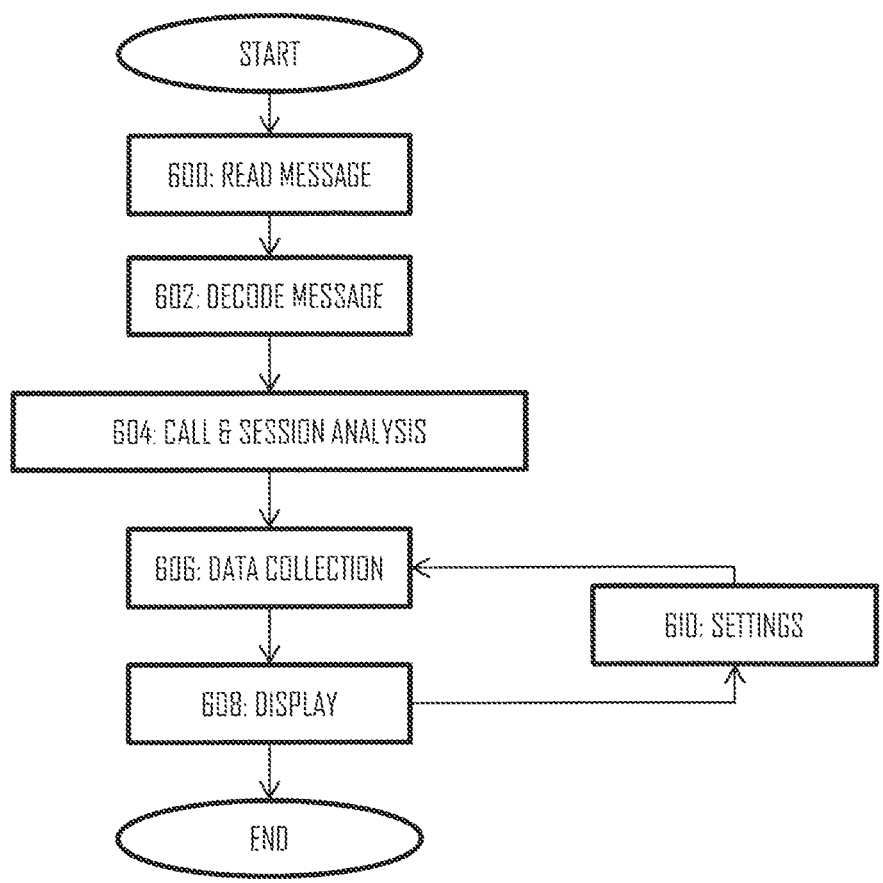
FIG. 6 illustrates a flow diagram of a process for providing a message sequence chart for display in the client computer according to an embodiment of the invention.

Referring to FIG. 6, the message capture and analysis circuitry 12 may be configured to read a captured message from a message capturing unit or from a file etc. in block 600. The message capture and analysis circuitry 12 may further store the captured message as such in the message database 22. In block 602, the message capture and analysis circuitry 12 may decode and extract contents of the captured message. In block 604, the message capture and analysis circuitry 12 may analyse the contents of the captured message and determine a call/session/transaction etc. of the message and store the message in a corresponding record in the message database 22. The message capture and analysis circuitry 12 may further determine whether the message is a control plane message or a data plane message and store the message together with an indicator indicating the plane of the message. The message capture and analysis circuitry 12 may carry out higher level functions as well, e.g. detect a status of a call/session/transaction and/or occurrence of errors from the contents of the messages. The Blocks 600 to 604 may be carried out for a plurality of messages captured from the communication network 140. As a consequence, the data record 24 now stores the captured messages as grouped on the basis of their calls/sessions/transactions and planes.

The network server further comprises a content parser circuitry 14 configured to communicate with a client computer 30 and to retrieve data from the memory according to the requests received from the client computer. Before describing the operation of the content parser circuitry 14, let us describe the client computer 30. The client computer 30 may be used by the user monitoring the operation of the communication network 140. The client computer may comprise a user interface 38 comprising the above-described display screen and at least one input device, e.g. a keyboard and a pointing device such as a mouse. The client computer may further comprise at least one memory 40 storing computer program instructions 44 configuring the client computer to carry out the above-described embodiments for providing the display of the message sequence chart. The client computer may further comprise a processing circuitry 32 comprising at least one processor. The processing circuitry 32 may comprise as a sub-circuitry a content extraction circuitry 36 configured to receive and extract contents received from the network server and to output the extracted contents to a display controller 34 configured to control the display screen to display the extracted contents.

A communication interface 18 may be provided between the network server 10 and the client computer 30. The communication interface 18 may comprise components of the network server 10, components of the client computer 30, and a physical communication medium between the network server 10 and the client computer. The medium may comprise one or more communication networks, e.g. the Internet, and communication circuitries in both the network server 10 and the client computer 30. The communication protocols employed may comprise any communication protocols employed in modern communication networks.

Let us now assume a situation where the user wants to view the contents of the data record 24 of multiple calls or sessions. The user may operate the user interface 38 of the client computer 30 to select one or more calls or sessions for review. The processing circuitry may then send a command to the network server 10 to retrieve a record of selected calls or sessions associated with the messages captured from the communication network 140. The content parser 14 receiving the request through the communication interface 18 may then acquire a corresponding record from the data record 24. Table 1 illustrates a presentation of the contents retrieved by the content parser 14, transferred over the communication interface 18 from the network server 10 to the client computer 30, and displayed in the display screen.

TABLE 1

| ID (IMSI) | Call Status | Errors |
|---|---|---|
| N | SET-P | Error1 |
| N + 1 | SET-P | No Errors |
| ... | ... | ... |

The presented contents may comprise an identifier for each call, e.g. an international mobile subscriber identity (IMSI) used to uniquely identify terminal devices in modern cellular communication systems. The contents may further comprise a current call or session status and an indication whether or not errors have occurred during the call or session. Let us assume that the user wishes to examine the reason for the errors detected in a given call or session, the user may input a command to the client computer 10 to acquire a message sequence chart associated with the selected call or session. As a consequence, the client computer 10 sends a request to the network server 10 to retrieve messages associated with the selected call or session. The request may comprise an indication whether a compressed or expanded display is requested. Upon receiving the request, the content parser 14 may access the message database 22 and retrieve the messages transferred during the requested call or session, and send the messages to the client computer. The content parser may then collect the requested messages (block 606) from the message database 22 and send the collected messages to the client computer for display. In an embodiment where the request specifies the compressed or expanded form, the content parser may carry out the compression if such is requested and transfer only the compressed information to the client computer. In other embodiments, the content parser 14 retrieves the full details of the messages and their transmission directions and sends a complete set of information to the client computer. The content extraction circuitry may then carry out the compression by grouping the data plane and/or control plane messages according to a determined criterion, selecting a common character string to the grouped messages, determining all transmission directions used in the grouped messages and selecting a multi-directional indicator representing all the transmission directions, and outputting the character string and the multi-directional indicator to the display controller. The display controller may then cause the display screen to display the received message sequence chart (block 608).

In the embodiment where the content parser 14 sends only the compressed information and the compressed information is displayed on the display screen, e.g. the display screen of FIG. 3, let us assume that the user wishes to see the expanded view by selecting the expansion component 304 or 308. As a consequence, the client computer may instruct the network server 10 to provide the expanded view of the selected messages that are compressed behind the character string and the multi-directional indicator 302 associated with the selected expansion component 304. Accordingly, the client computer may change the settings (block 610) according to which the content parser 14 provides the message sequence chart. In response, the content parser 14 may retrieve from the message database the requested message sequence (block 606) and send it to the client computer for displaying the expanded view in block 608.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 5 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to the client computer and/or the network server comprised in the above-described network analysis system. The communication protocols used in the monitored communication networks, the specifications of networks, and their network elements and terminal devices develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for outputting a message sequence chart in a computer apparatus, the method comprising:
   acquiring messages transferred in a communication network between at least two nodes, wherein the messages are logically divided into control plane messages and data plane messages and each message is associated with its transmission direction;
   causing display of the at least two nodes and the control plane messages on a display screen in the message sequence chart and in a form where each control plane message is displayed together with a unidirectional indicator indicating the transmission direction of the control plane message between the at least two nodes such that the unidirectional indicator is displayed between the at least two nodes while the data plane messages in the message sequence chart in a compressed form with a single multidirectional indicator representing a plurality of data plane messages and indicating the transmission directions of the plurality of data plane messages between the at least two nodes such that the single multidirectional indicator is displayed between the at least two nodes;
   wherein the method is carried out in a client computer;
   wherein said acquiring step further comprises receiving the data plane messages from a network server in the compressed form, and the method further comprising:
   causing display of an expansion component in connection with the compressed form of the data plane messages; and
   detecting a user input selecting the expansion component and, in response to the detection, sending a request to the network server to provide a more complete set of information on the data plane messages and, upon receiving said more complete set of information from the network server, providing an expanded display of the data plane messages, wherein each data plane message is displayed together with unidirectional indicator indicating the transmission direction of the data plane message.

2. The method of claim 1, further comprising:
   grouping the data plane messages together on the basis of a common feature selected from at least one of the following: application, communication protocol, originating device, destination device, flow, session; and
   displaying the data plane messages of a group in the compressed form.

3. The method of claim 1, further comprising:
   causing display of the control plane messages in the message sequence chart in a compressed form with a single multidirectional indicator representing a plurality of control plane messages and indicating the transmission directions of the plurality of control plane messages.

4. The method of claim 3, further comprising:
   grouping the control plane messages together on the basis of a common feature selected from at least one of the following: application, communication protocol, originating device, destination device, flow, session; and
   displaying the control plane messages of a group in the compressed form.

5. The method of claim 1, wherein the method is carried out in a client computer, said acquiring further comprising receiving the data plane messages from a network server in the compressed form.

6. The method of claim 1, further comprising:
   causing display of an expansion component in connection with the compressed form of the data plane messages; and
   detecting a user input selecting the expansion component and, in response to the detection, providing an expanded display of the data plane messages, wherein each data plane message is displayed together with unidirectional indicator indicating the transmission direction of the data plane message.

7. The method of claim 1, wherein the messages are acquired from a network interface connected to a network element of the communication network through which the messages are transferred in the communication network.

8. An apparatus, comprising:
   at least one processor; and
   at least one memory including a computer program code, wherein the at least one memory and the computer program code are configured, with the at least one processor, to cause the apparatus to:
   acquire messages transferred in a communication network between at least two nodes, wherein the messages are logically divided into control plane messages and data plane messages and each message is associated with its transmission direction;
   cause display of the at least two nodes and the control plane messages on a display screen in a message sequence chart and in a form where each control plane message is displayed together with a unidirectional indicator indicating the transmission direction of the control plane message between the at least two nodes such that the unidirectional indicator is displayed between the at least two nodes while causing display of the data plane messages in the message sequence chart in a compressed form with a single multidirectional indicator representing a plurality of data plane messages and indicating the transmission directions of the plurality of data plane messages between the at least two nodes such that the single multidirectional indictor is displayed between the at least two nodes;
   wherein the apparatus is a client computer, and wherein the at least one memory and the computer program code are configured, with the at least one processor, to cause the client computer to:
   receive the data plane messages from a network server in the compressed form, cause display of an expansion component in connection with the compressed form of the data plane messages; and
   detect a user input selecting the expansion component and, in response to the detection, sending a request to the network server to provide a more complete set of information on the data plane messages and, upon receiving said more complete set of information from the network server, provide an expanded display of the data plane messages, wherein each data plane message is displayed together with unidirectional indicator indicating the transmission direction of the data plane message.

9. The apparatus of claim 8, wherein the at least one memory and the computer program code are configured, with the at least one processor, to cause the apparatus to:
   group the data plane messages together on the basis of a common feature selected from at least one of the following: application, communication protocol, originating device, destination device, flow, session; and
   cause display of the data plane messages of a group in the compressed form.

10. The apparatus of claim 8, wherein the at least one memory and the computer program code are configured, with the at least one processor, to cause the apparatus to cause display of the control plane messages in the message sequence chart in a compressed form with a single multidirectional indicator representing a plurality of control plane messages and indicating the transmission directions of the plurality of control plane messages.

11. The apparatus of claim 10, wherein the at least one memory and the computer program code are configured, with the at least one processor, to cause the apparatus to:
    group the control plane messages together on the basis of a common feature selected from at least one of the following: application, communication protocol, originating device, destination device, flow, session; and
    cause the display of the control plane messages of a group in the compressed form.

12. The apparatus of claim 8, wherein the apparatus is a client computer, and wherein the at least one memory and the computer program code are configured, with the at least one processor, to cause the client computer to receive the data plane messages from a network server in the compressed form.

13. The apparatus of claim 8, wherein the at least one memory and the computer program code are configured, with the at least one processor, to cause the apparatus to:
    cause display of an expansion component in connection with the compressed form of the data plane messages; and
    detect a user input selecting the expansion component and, in response to the detection, providing an expanded display of the data plane messages, wherein each data plane message is displayed together with unidirectional indicator indicating the transmission direction of the data plane message.

14. The apparatus of claim 8, wherein the messages are acquired from a network interface connected to a network element of the communication network through which the messages are transferred in the communication network.

15. A computer program product embodied on a non-transitory distribution medium readable by a computer and comprising program instructions which, when loaded into an apparatus, execute a computer process for outputting a message sequence chart in the apparatus, the process comprising:
    acquiring messages transferred in a communication network between at least two nodes, wherein the messages are logically divided into control plane messages and data plane messages and each message is associated with its transmission direction;
    causing display of the at least two nodes and the control plane messages on a display screen in the message sequence chart and in a form where each control plane message is displayed together with a unidirectional indicator indicating the transmission direction of the control plane message between the at least two nodes such that the unidirectional indicator is displayed between the at least two nodes while the data plane messages in the message sequence chart in a compressed form with a single multidirectional indicator representing a plurality of data plane messages and indicating the transmission directions of the plurality of data plane messages between the at least two nodes such that the single multidirectional indicator is displayed between the at least two nodes;
    wherein the process is carried out in a client computer;
    wherein said acquiring step further comprises receiving the data plane messages from a network server in the compressed form, and the process further comprising:
    causing display of an expansion component in connection with the compressed form of the data plane messages; and
    detecting a user input selecting the expansion component and, in response to the detection, sending a request to the network server to provide a more complete set of information on the data plane messages and, upon receiving said more complete set of information from the network server, providing an expanded display of the data plane messages, wherein each data plane message is displayed together with unidirectional indicator indicating the transmission direction of the data plane message.

* * * * *